2,709,705

16α-HYDROXYPROGESTERONE, 16α-HYDROXYDI-HYDROPROGESTERONE AND ESTERS THEREOF

David Perlman, Princeton, and Josef Fried, New Brunswick, N. J., and Elwood O. Titus, Silver Spring, Md., and Asger F. Langlykke, Highland Park, N. J., assignors, by mesne assignments, to Olin Mathieson Chemical Corporation, a corporation of Virginia No Drawing. Application July 27, 1951, Serial No. 239,018

3 Claims. (Cl. 260—397.4)

This invention relates to, and has for its object the improvement of, methods of producing medicinal agents (or intermediates for medicinal agents) from steroids by microbiological action.

Prior to this invention, attempts had been made to convert steroids into medicinally-useful substances by utilizing the activity of growing microorganisms, but with generally unsatisfactory results from the standpoints of utility of the substance produced and/or efficiency of its production. Thus, the prior attempts resulted either in oxidation of hydroxy groups to keto groups (as in the conversion of dehydroepiandrosterone to androstenedione) or rupture of the steroid nucleus, rather than the desired addition of oxygen to the steroid nucleus.

It has been found that steroids, especially 3-ketosteroids, can be converted into useful derivatives by subjecting them to the action of enzymes of a special microorganism under aerobic conditions. This microorganism is an actinomycete isolated from a soil sample from Yonkers, New York. When grown on synthetic or natural media, it produces an antibiotic inhibiting gram-positive and gram-negative bacteria; and when grown in media supplemented with cobalt salts, relatively large quantities of vitamin $B_{12}$ are formed. These properties of the microorganism, though utilizable in the methods of this invention to obtain the antibiotic and/or a vitamin $B_{12}$ as a by-product, are of secondary importance, the invention being based primarily on the ability of enzymes of the microorganism to produce useful derivatives of steroids subjected to their action under aerobic conditions. The action of the enzymes can be utilized either by including the steroid in an aerobic culture of the microorganism, or by bringing together, in an aqueous medium, the steroid, air, and enzymes of non-proliferating cells of the microorganism. Thus, when supplemented with progesterone, a culture of the microorganism forms the novel, recoverable, and useful 16 α-hydroxy derivative thereof as the first oxidation product.

The microorganism, when grown on agar, has mature vegetative hyphae whose diameter varies from 0.9 to 1.2 microns. The aerial mycelium is hyaline under the microscope, generally branched, not forming loops or spirals. Individual filaments are rarely or not septate. The color of colonies when viewed on agar without magnification is white to light gull gray (Ridgway plate L III 10f). The spores are oval to oblong. Mature spores range from about 1.0 to 1.2 microns in diameter and from 1.0 to 1.2 microns in length. Individual spores are colorless at maturity, but in mass appear white to gray when viewed without magnification (Ridgway plate L III 10f).

The microorganism will liquefy gelatine, peptonize litmus milk, reduce nitrate to nitrite, and produce hydrogen sulfide when grown on Kligler iron agar. It does not produce indole when grown on tryptone agar. It will grow on media containing ammonium sulfate, or sodium nitrate, or asparagine, or tryptophane as sole source of nitrogen (basal medium: $KH_2PO_4$, 2.38 g.; $K_2HPO_4$, 5.65 g.; $MgSO_4.7H_2O$, 1.0 g.; $CuSO_4.5H_2O$, 0.0064 g.; $FeSO_4.7H_2O$, 0.0011 g.; $MnSO_4.4H_2O$, 0.0079 g.; $ZnSO_4.7H_2O$, 0.0015 g.; agar (Difco), 15 g.; glucose, 10 g.; water to 1 liter; pH adjusted to 6.8). When the same basal medium without carbohydrate but with 0.106 g. N [as$(NH_4)_2SO_4$] is used, no growth is obtained. Addition of the following sugars (at 10 g./l.) supports growth: arabinose, rhamnose, glucose, galactose, fructose, mannose, lactose, maltose, dextrin, starch, glycerol, mannitol, salicin. No growth is noted when sucrose, raffinose, sorbose, sorbitol or inositol are added to the basal medium. Sodium acetate and sodium citrate support growth when added to the basal medium, but sodium tartrate does not.

A pure culture of this microorganism has been filed with the American Type Culture Collection, Washington, D. C. under No. 11,009, and the microorganism is accordingly hereinafter referred to as "actinomycete species ATCC 11,009."

In general, the conditions of culturing actinomycete species ATCC 11,009 for the purposes of this invention are (except for the inclusion of the steroid to be converted) the same as those of culturing various other actinomycetes for the production of antibiotics and/or vitamin $B_{12}$, i. e., the microorganism is aerobically grown in contact with (in or on) a suitable fermentation medium. A suitable medium essentially comprises a source of nitrogenous and growth-promoting factors, and an assimilable source of carbon and energy. The latter may be a carbohydrate (such as glucose, maltose, starch, or dextrin) and/or the steroid itself. Preferably, however, the medium includes an assimilable source of carbon and energy in addition to the steroid; and preferably also, this source is at least in substantial part a member of the group consisting of (1) fat acids having at least 14 carbon atoms and (2) fats. Use of such lipid source of carbon and energy (especially use of a fatty oil) is advantageous in that it enhances the availability of the steroid for conversion. The medium may also include precursors for by-products particularly desired, e. g., an assimilable source of cobalt, where vitamin $B_{12}$ is a desired by-product.

Among the fats utilizable for the purposes of this invention are: lard oil, soybean oil, linseed oil, cottonseed oil, peanut oil, coconut oil, corn oil, castor oil, sesame oil, crude palm oil, fancy mutton tallow, sperm oil, olive oil, tristearin, tripalmitin, triolein, and trilaurin. Among the fat acids utilizable for the purposes of this invention are: stearic acid, palmitic acid, oleic acid, linoleic acid, and myristic acid.

The source of nitrogenous and growth promoting factors may be organic (e. g., soybean meal, corn steep liquor, meat extract, and/or distillers solubles) or synthetic (i. e., composed of simple synthesizable organic and inorganic compounds).

Among the steroids which may be converted by the practice of this invention are: progesterone; pregnenolone; pregnanolone; 17 - hydroxy - 11 - desoxycorticosterone (Reichstein's compound S); compound S acetate; desoxycorticosterone; ergosterol; stigmasterol; cholesterol; diosgenin; and desoxycorticosterone acetate. Where an oxidizable hydroxy group is present in the steroid and its oxidation is not desired, it may be converted into a group resistant to oxidation and capable of reconversion into a hydroxyl group; e. g., an ester, ether or halogen group.

The following examples are illustrative of the invention:

Example 1

An aqueous medium of the following composition is prepared:

| | | |
|---|---|---|
| Soybean oil | ml | 8.8 |
| Progesterone | g | 0.25 |
| Soybean meal | g | 30 |
| $Co(NO_3)_2 \cdot 6H_2O$ | g | 0.005 |
| Water | liter | 1 |

100 ml. portions of the medium are distributed in 500 ml. Erlenmeyer flasks, and the flasks are plugged with cotton and sterilized in the usual manner (by autoclaving). When cool, each of the flasks is inoculated with 2% of a vegetative inoculum of actinomycete species ATCC 11,009 which has been grown for 47–72 hours on a soybean meal-glucose medium, and the flasks are maintained at 25° C. and mechanically shaken. After two days incubation, the medium has a pH of about 6.3, a vitamin $B_{12}$ content of about 0.15 micrograms/ml., a progesterone content of about 106 micrograms/ml., and a 16α-hydroxyprogesterone content of about 115 micrograms/ml. The presence and quantity of 16α-hydroxyprogesterone and un-oxidized progesterone is determined by extracting the sample with chloroform, separating the oxidized compound from progesterone using the filter paper partition chromatographic method of Zaffaroni (Science 111: 6, 1950; propylene glycol-toluene system) and determining the quantity of steroid in each "spot" using a quartz spectrophotometer (240 m$\mu$). The oxidized steriod appears to predominate in the cell-free filtrate, while the unoxidized steroid is associated with the cells of the microorganism.

The 16α-hydroxyprogesterone is recovered from the culture filtrate as described hereinafter.

Example 2

(a) An aqueous medium of the following composition is prepared, and distributed, sterilized, inoculated, and incubated as described in Example 1:

| | | |
|---|---|---|
| Soybean oil | ml | 2.2 |
| Progesterone | g | 0.25 |
| Glycine | g | 2.6 |
| Sodium acid glutamate | g | 2.2 |
| $FeSO_4 \cdot 7H_2O$ | g | 0.025 |
| $ZnSO_4 \cdot 7H_2O$ | g | 0.03 |
| $CuSO_4 \cdot 5H_2O$ | g | 0.012 |
| $Co(NO_3)_2 \cdot 6H_2O$ | g | 0.005 |
| $MnSO_4 \cdot 4H_2O$ | g | 0.016 |
| $CaCl_2 \cdot H_2O$ | g | 0.05 |
| $MgSO_4 \cdot 7H_2O$ | g | 0.5 |
| $K_2HPO_4 \cdot 3H_2O$ | g | 0.5 |
| Water | liter | 1 |

(b) After three days' incubation, the (unfiltered) medium from 700 flasks is pooled, and centrifuged; and the clear liquid is extracted with thirteen 4-liter portions of chloroform. The chloroform extract is evaporated to dryness in vacuo, and the residue (about 31 g.) is mixed with 400 ml. of 80% methanol. The resulting suspension is extracted with seven 400 ml. portions of hexane (which removes all the lipids and leaves the essentially pure oxidized steroids in the aqueous methanol phase). The aqueous methanol phase is evaporated, leaving about 8.7 g. of a semicrystalline mixture; and the latter is dissolved in 50 ml. chloroform and 50 ml. benzene, and chromatographed on a column (7 cm. diameter) containing 800 g. of a mixture of equal volumes magnesium silicate and a filter aid (e. g., Celite); and the column (X) is then washed with a mixture of equal volumes of chloroform and benzene. At first, residual progesterone was eluted, followed by a small fraction of crystalline material (Y), and then by the main product of the fermentation, 16α-hydroxyprogesterone, which is recovered from the eluate by evaporation of the solvents and then crystallized from acetone.

The 16α-hydroxyprogesterone forms hexagonal crystals melting at 225–6° C. It gives a blue coloration with iodine and KI on filter paper. $[\alpha]_D^{23} + 170°$ (C, 0.38 in chloroform).

U. V.: $\lambda_{max.}^{alc.}$ 239 m$\mu$ ($\epsilon = 17,000$)

I. R.: $\lambda_{max.}^{Nujol}$ 3.04 (hydroxyl); 5.90 (20-keto);
6.05 and 6.20 (3-keto, $\Delta^{4,5}$)

Its analysis (C, 76.61; H, 9.56) is in good agreement with that calculated for $C_{21}H_{30}O_3$.

Acetylation of 16α-hydroxyprogesterone with acetic anhydride and pyridine yields a monoacetate, which on crystallization from acetone and hexane melts at 134–5° C., has $[\alpha]_D^{22} + 107°$, and gives the following figures on analysis: C, 73.64; H, 8.61; and acetyl, 11.63. Esters of 16α-hydroxyprogesterone with other organic acids (e. g., benzoic acid) may be obtained analogously.

The crystalline material Y obtained from the second eluate by evaporation of the solvent and repeated crystallization from acetone melts at 199–200° C., and has the characteristics following: $[\alpha]_D^{23} + 90.5°$ (C, 0.82 in chloroform).

U. V.: $\lambda_{max.}^{alc.}$ 284 m$\mu$ ($\epsilon = 65$)

Analysis: C, 76.12; H, 9.73 (in good agreement with that calculated for $C_{21}H_{32}O_3$). The product is a 4,5-dihydro-16α-hydroxyprogesterone. It may be converted into its acetate (or other ester) in the same manner as 16α-hydroxyprogesterone.

Further elution of the silicate-filter aid column X with pure chloroform yields an additional quantity of 16α-hydroxyprogesterone. The column is then further eluted with a mixture of three parts chloroform and one part acetone; and the solvent is removed from this eluate by evaporation and the residue crystallized from acetone. The product melts at 215.5–216.5° C., and has the following characteristics: $[\alpha]_D^{24} - 39°$ (chloroform);

U. V.: $\lambda_{max.}^{alc.}$ 243 m$\mu$ ($\epsilon = 14,400$)

Its analysis (C, 73.09; H, 8.68) is in good agreement with that calculated for $C_{21}H_{30}O_4$, the product being believed to be a dihydroxyprogesterone with one of the hydroxy groups in 16-position.

Example 3

Duplicate of Example 1 using a medium of the following composition:

| | | |
|---|---|---|
| Soybean oil | ml | 8.8 |
| Progesterone | g | 0.25 |
| Dried brewers' yeast | g | 25.0 |
| $Co(NO_3)_2 \cdot 6H_2O$ | g | 0.005 |
| Water | liter | 1 |

After two days' incubation, the medium has a pH of about 6.3, a vitamin $B_{12}$ content of about 0.20 microgram ml., and a 16α-hydroxyprogesterone content of about 130 micrograms/ml. (about 120 micrograms/ml. in the culture filtrate).

Example 4

Duplicate of Example 1 using a medium of the following composition:

| | | |
|---|---|---|
| Soybean oil | ml | 8.8 |
| Progesterone | g | 0.25 |
| $Co(NO_3)_2 \cdot 6H_2O$ | g | 0.005 |
| Cornsteep liquor (neutralized to pH 7) | g | 40 |
| $CaCO_3$ | g | 5 |
| Water | liter | 1 |

After three days' incubation, the medium has a pH of about 6.5, a vitamin $B_{12}$ content of about 0.21 microgram/ml., and a 16α-hydroxyprogesterone content of about 95 micrograms/ml. (about 85 micrograms/ml. in the culture filtrate).

On incubating for four days, both the vitamin $B_{12}$ and 16α-hydroxyprogesterone titers of the medium are materially increased. Thus, on extension of the incubation in Example 3, to four days, the vitamin $B_{12}$ content is raised to 0.43 microgram/ml., and the 16α-hydroxyprogesterone content to 150 micrograms/ml. (140 micrograms/ml. in the culture filtrate).

In some cases, a further increase in titer may be obtained on further extension of the incubation period. Thus, on extension of the incubation in Example 4, to 7 days, the 16α-hydroxyprogesterone content is raised to 180 micrograms/ml. (175) micrograms/ml. in the culture filtrate).

In examples given hereinbefore, the steroid precursor is progesterone; but other steroid precursors can be converted into useful steroid derivatives, as illustrated by the following examples:

Example 5

(a) 3 g. compound S acetate is incorporated in 15 liters of a soybean oil medium of the following composition:

| | |
|---|---|
| Glycine | g-- 2.6 |
| Sodium acid glutamate | g-- 2.1 |
| $MgSO_4 \cdot 7H_2O$ | g-- 0.5 |
| $K_2HPO_4 \cdot 3H_2O$ | g-- 0.5 |
| $ZnSO_4 \cdot 7H_2O$ | g-- 0.03 |
| $MnSO_4 \cdot 4H_2O$ | g-- 0.016 |
| $CuSO_4 \cdot 5H_2O$ | g-- 0.012 |
| $FeSO_4 \cdot 7H_2O$ | g-- 0.025 |
| $CaCl_2 \cdot H_2O$ | g-- 0.05 |
| Soybean oil | g-- 2.2 |
| Water | liter-- 1 |

The medium is then inoculated with actinomycete species ATCC 11,009 and incubated in a shake flask as described hereinbefore for 4 days. The unfiltered medium is extracted with three 15-liter portions of chloroform, and the solvent evaporated from the extract; and the residue is taken up in 4 liters benzene, and the benzene solution (W) is extracted eight times with 8-liter portions of water. The aqueous phase (Z) is then extracted with 6.4 liters benzene (extract W'); and the benzene extracts W and W' are combined, the benzene removed by evaporation, and the residue recrystallized from alcohol, yielding about 1.1 g. of recovered crude compound S acetate.

(b) The aqueous phase Z is extracted with chloroform, the chloroform is evaporated from the extract, and the residue is taken up in hot 95% ethanol. On standing, a precipitate is formed, the product melting at about 208–13° C.; and an additional yield of the product is obtained by evaporating the mother liquor to half-volume. Repeated recrystallization from ethanol yields the product as characteristic diamond-shaped platelets melting at about 224–7° C. Acetylation of the product in pyridine-acetic anhydride yields needles melting at 209–11° C. $[\alpha]_D^{25} -58°$ (0.53% in chloroform). Analysis: C, 67.5; H, 8.08. The product appears to be a hydroxy derivative of compound S.

Example 6

1 g. desoxycorticosterone acetate is incorporated in 5 liters of the soybean oil medium described in Example 5 and the medium is inoculated and incubated as described in that example for 5 days. The unfiltered medium is extracted with three 5-liter portions of chloroform, the solvent evaporated from the extract, and the residue partitioned between benzene and water. On further purification, the aqueous phase yields an oxidized derivative of desoxycorticosterone, as indicated by mobility in filter-paper partition chromatography using Zaffaroni's methods.

Example 7

100 mg. pregnenolone is incorporated in 500 ml. of the soybean oil medium described in Example 5, and the medium is inoculated and incubated as described in that example for 3 days. The unfiltered medium is extracted once with 500 ml. chloroform and again with 250 ml. chloroform, and the extract further treated to yield a mixture of oxidized derivatives of pregnenolone, probably 16α-hydroxy-progesterone and progesterone (based on filter-paper partition chromatography).

Other media than those disclosed in the foregoing examples may be used for the purpose of this invention, the only requirement being of course that they be media which support the aerobic growth of actinomycetes. The vitamin $B_{12}$ content of the media may be recovered by the conventional procedures for recovery from actinomycete cultures. An adequate (sterile) air supply should be maintained during the fermentation, which may be done in the conventional manner of conducting aerobic fermentations, e. g., by exposure of a large surface of the medium to air or by submerged aerated culture. The incubation time may determine the degree of oxidation. Thus, progesterone appears to be oxidized first to progesterone and on further incubation the latter is converted to 16α-hydroxyprogesterone. The incubation may of course be stopped at a time when the medium contains the highest titer of progesterone, if that is the desired product.

In the examples given hereinbefore, the steroid is included in the fermentation medium before inoculation with the microorganism; but the steroid may be added after the inoculation and even after substantial growth of the microorganism has occurred, as illustrated by the example following. Where an intermediate stage of oxidation is desired, as for example progesterone rather than 16α-hydroxyprogesterone, it is favored by a shorter fermentation period.

Example 8

An aqueous medium of the following composition is prepared, and distributed, sterilized, inoculated, and incubated as described in Example 1:

| | |
|---|---|
| Soybean meal | g-- 15 |
| Glucose | g-- 10 |
| Soybean oil | g-- 2 |
| Water | liter-- 1 |

After incubating for one day, pregnenolone is added to each flask in the proportion of 200 mg./liter medium; and the medium is further incubated for six hours, and the pooled medium then extracted with three 1-liter portions of chloroform. The pooled chloroform extract contains about 190 mg. progesterone.

In the examples given hereinbefore, the steroid is converted by inclusion in an aerobic culture of the microorganism; but the conversion can also be effected by bringing together the steroid and air in an aqueous suspension of the non-propagating microorganism (or by bringing together the steroid, air and enzymes of the microorganism in an aqueous cell-free medium), as illustrated by the following example:

Example 9

The two-day culture of actinomycete species ATCC 11,009 described in Example 1 is centrifuged, resuspended in distilled water, recentrifuged, and again resuspended in distilled water. 40 ml. aliquots of the suspension are placed in 125 ml. Erlenmeyer flasks, 10 mg./liter of a polyoxyethylene ether of a partial higher fatty acid ester of sorbitan (e. g., Tween) and 200 mg./liter of pregnenolone are added to each flask, and the flasks are agitated (on a reciprocating shaker) at 25° C. for 24 hours. The pregnenolone added is almost quantitatively converted to progesterone, which may be recovered by chloroform extraction.

16α-hydroxy-progesterone may be converted into the known 17-hydroxyprogesterone by dehydrating the former with aluminum tertiary butylate to obtain 16-dehydroprogesterone, and converting the dehydro compound into the 17-hydroxy compound by the method described by Julian et al. in J. A. C. S. 72, 367 (1950). The dehydration may, for example, be effected as follows: A solution of 300 mg. aluminum tertiary butylate in 10 ml. benzene is added to a solution of 97 mg. 16α-hydroxyprogesterone in 5 ml. dry acetone, the mixture is refluxed for 12 hours, and the resulting gel is decomposed by the addition of dilute sulfuric acid. The benzene layer formed is separated from the aqueous layer, and the latter extracted with chloroform; and the combined benzene layer and chloroform extract is washed with dilute sodium bicarbonate solution and water, dried over sodium sulfate, and evaporated to dryness in vacuo. The residue (about 91 mg.) is dissolved in a mixture of 3 ml. benzene and 3 ml. hexane, and chromatographed on 4 g. sulfuric acid-washed alumina. Elution with a 2:1 benzene-hexane mixture yields pure 16α-dehydroprogesterone as thin platelets, which after recrystallization from an acetone-hexane mixture melts at 190–191.5° C., and has the following properties: $[\alpha]_D^{23} + 134.5°$ (concentration, 0.90 in chloroform);

U. V.: $\lambda_{max.}^{alc.}$ 240 m$\mu$ ($\epsilon = 28{,}000$), 315 m$\mu$ ($\epsilon = 148$)

These properties are in good agreement with those reported for 16α-dehydroprogesterone by Fukushima and Gallagher, J. A. C. S. 73, 201 (1951); and the analysis (C, 80.94%; H, 8.99%) is in good agreement with that calculated for $C_{21}H_{28}O_2$.

The invention may be variously otherwise embodied within the scope of the appended claims.

We claim:

1. A member of the class consisting of 16α-hydroxyprogesterone, 4,5-dihydro-16α-hydroxyprogesterone, and the acetic acid esters thereof.
2. 16α-hydroxyprogesterone.
3. 4,5-dihydro-16α-hydroxyprogesterone.

References Cited in the file of this patent

UNITED STATES PATENTS

| Number | Name | Date |
|---|---|---|
| 2,184,167 | Schoeller | Dec. 19, 1939 |
| 2,304,837 | Marker | Dec. 15, 1942 |
| 2,318,641 | Stubbs | May 11, 1943 |
| 2,352,851 | Marker | July 4, 1944 |
| 2,353,808 | Butenandt | July 18, 1944 |
| 2,360,447 | Schmidt | Oct. 17, 1944 |
| 2,383,472 | Crooks | Aug. 27, 1945 |